(12) United States Patent
Katzer et al.

(10) Patent No.: US 8,655,310 B1
(45) Date of Patent: Feb. 18, 2014

(54) CONTROL OF SECURE ELEMENTS THROUGH POINT-OF-SALE DEVICE

(75) Inventors: Robin D. Katzer, Olathe, KS (US); Sei Y. Ng, Olathe, KS (US); M. Jeffrey Stone, Overland Park, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1000 days.

(21) Appl. No.: 12/099,771

(22) Filed: Apr. 8, 2008

(51) Int. Cl.
*H04M 1/66* (2006.01)
*H04M 1/68* (2006.01)
*H04M 3/16* (2006.01)

(52) U.S. Cl.
USPC ............... 455/410; 455/411; 705/16; 705/17; 705/18

(58) Field of Classification Search
USPC ............................... 455/410, 411; 705/16–18
See application file for complete search history.

(56) References Cited

U.S. PATENT DOCUMENTS

| | | | |
|---|---|---|---|
| 5,453,601 A | 9/1995 | Rosen | |
| 5,496,966 A | 3/1996 | Hightower et al. | |
| 5,989,720 A | 11/1999 | Taniyama | |
| 6,122,625 A | 9/2000 | Rosen | |
| 6,298,442 B1 | 10/2001 | Kocher et al. | |
| 6,446,049 B1 | 9/2002 | Janning et al. | |
| 6,584,326 B1 | 6/2003 | Boydston et al. | |
| 6,679,423 B2 | 1/2004 | Ijichi et al. | |
| 6,879,965 B2 | 4/2005 | Fung et al. | |
| 6,880,085 B1 | 4/2005 | Balczewski et al. | |
| 7,146,159 B1 | 12/2006 | Zhu | |
| 7,233,785 B2 | 6/2007 | Yamagishi et al. | |
| 7,269,256 B2 | 9/2007 | Rosen | |
| 7,413,113 B1 | 8/2008 | Zhu | |
| 7,434,723 B1 | 10/2008 | White et al. | |
| 7,475,044 B1 | 1/2009 | Kawai et al. | |
| 7,494,067 B1 | 2/2009 | Zhu | |
| 7,546,956 B2 | 6/2009 | Adams et al. | |
| 7,567,795 B1 * | 7/2009 | Champion et al. | 455/410 |
| 7,644,039 B1 | 1/2010 | Magee et al. | |
| 7,644,859 B1 | 1/2010 | Zhu | |
| 7,707,113 B1 | 4/2010 | DiMartino et al. | |
| 7,748,636 B2 | 7/2010 | Finn | |
| 7,819,307 B2 | 10/2010 | Lyons et al. | |
| 7,822,688 B2 | 10/2010 | Labrou et al. | |
| 7,926,714 B1 | 4/2011 | Zhu | |
| 8,055,184 B1 | 11/2011 | DiMartino et al. | |
| 8,060,449 B1 | 11/2011 | Zhu | |
| 8,107,953 B2 | 1/2012 | Zimmerman et al. | |
| 8,123,128 B1 | 2/2012 | Zhu | |
| 8,126,806 B1 | 2/2012 | DiMartino et al. | |
| 8,165,961 B1 | 4/2012 | DiMartino et al. | |
| 8,200,582 B1 | 6/2012 | Zhu | |
| 8,244,169 B1 | 8/2012 | DiMartino et al. | |

(Continued)

OTHER PUBLICATIONS

DiMartino, Allison, "Method for Launching an Electronic Wallet," filed Dec. 3, 2007, U.S. Appl. No. 11/949,759.

(Continued)

*Primary Examiner* — Liton Miah (57) ABSTRACT

A method of preventing identity theft is provided. The method comprises reading confidential information from a mobile terminal that is not in communication with the public wireless communication network and determining if the mobile terminal has been reported lost. When the mobile terminal is determined to have been reported lost, the release of the confidential information by the mobile terminal is disabled.

18 Claims, 7 Drawing Sheets

(56) References Cited

U.S. PATENT DOCUMENTS

| | | | |
|---|---|---|---|
| 8,249,935 B1 | 8/2012 | DiMartino et al. | |
| 8,250,662 B1 | 8/2012 | Zhu | |
| 8,468,095 B1 | 6/2013 | DiMartino et al. | |
| 2001/0005184 A1 | 6/2001 | Tsuno et al. | |
| 2002/0006806 A1 | 1/2002 | Kinnunen et al. | |
| 2002/0011519 A1 | 1/2002 | Shults, III | |
| 2002/0018016 A1 | 2/2002 | Radonic | |
| 2002/0052754 A1 | 5/2002 | Joyce et al. | |
| 2002/0062284 A1 | 5/2002 | Kawan | |
| 2002/0123971 A1 | 9/2002 | Maritzen et al. | |
| 2002/0147913 A1 | 10/2002 | Lun Yip | |
| 2003/0009382 A1 | 1/2003 | D'Arbeloff et al. | |
| 2003/0028481 A1 | 2/2003 | Flitcroft et al. | |
| 2003/0032409 A1 | 2/2003 | Hutcheson et al. | |
| 2003/0045328 A1* | 3/2003 | Natsuno | 455/558 |
| 2003/0070080 A1 | 4/2003 | Rosen | |
| 2003/0083933 A1 | 5/2003 | McAlear | |
| 2003/0149900 A1 | 8/2003 | Glassman et al. | |
| 2003/0211862 A1 | 11/2003 | Hutchison, IV et al. | |
| 2004/0093265 A1 | 5/2004 | Ramchandani et al. | |
| 2004/0122771 A1 | 6/2004 | Celi, Jr. et al. | |
| 2004/0166839 A1 | 8/2004 | Okkonen et al. | |
| 2004/0192303 A1* | 9/2004 | Puthenkulam | 455/435.1 |
| 2004/0203601 A1* | 10/2004 | Morriss et al. | 455/411 |
| 2005/0216424 A1 | 9/2005 | Gandre et al. | |
| 2005/0234778 A1 | 10/2005 | Sperduti et al. | |
| 2005/0278192 A1 | 12/2005 | Cantini et al. | |
| 2006/0073808 A1 | 4/2006 | Buchert | |
| 2006/0085847 A1 | 4/2006 | Ikeuchi et al. | |
| 2006/0136334 A1 | 6/2006 | Atkinson et al. | |
| 2006/0164318 A1 | 7/2006 | Lastinger et al. | |
| 2006/0165060 A1 | 7/2006 | Dua | |
| 2006/0167823 A1 | 7/2006 | York et al. | |
| 2006/0191995 A1 | 8/2006 | Stewart et al. | |
| 2006/0211408 A1 | 9/2006 | Yamagishi et al. | |
| 2007/0010213 A1 | 1/2007 | Dewan | |
| 2007/0011461 A1 | 1/2007 | Jeng | |
| 2007/0080215 A1 | 4/2007 | Ramachandran et al. | |
| 2007/0095892 A1 | 5/2007 | Lyons et al. | |
| 2007/0125840 A1 | 6/2007 | Law et al. | |
| 2007/0145152 A1 | 6/2007 | Jogand-Coulomb et al. | |
| 2007/0197261 A1 | 8/2007 | Humbel | |
| 2007/0198410 A1 | 8/2007 | Labgold et al. | |
| 2007/0223685 A1 | 9/2007 | Boubion et al. | |
| 2007/0233615 A1 | 10/2007 | Tumminaro | |
| 2007/0234427 A1 | 10/2007 | Gardner et al. | |
| 2007/0244811 A1 | 10/2007 | Tumminaro | |
| 2007/0248232 A1 | 10/2007 | Driscoll et al. | |
| 2007/0255620 A1 | 11/2007 | Tumminaro et al. | |
| 2007/0255652 A1 | 11/2007 | Tumminaro et al. | |
| 2007/0278290 A1* | 12/2007 | Messerges et al. | 235/380 |
| 2007/0281664 A1 | 12/2007 | Kaneko et al. | |
| 2007/0291995 A1 | 12/2007 | Rivera | |
| 2008/0059379 A1 | 3/2008 | Ramaci et al. | |
| 2008/0067240 A1 | 3/2008 | Nakano et al. | |
| 2008/0078831 A1 | 4/2008 | Johnson et al. | |
| 2008/0116264 A1* | 5/2008 | Hammad et al. | 235/382 |
| 2008/0121687 A1 | 5/2008 | Buhot | |
| 2008/0126260 A1 | 5/2008 | Cox et al. | |
| 2008/0201212 A1 | 8/2008 | Hammad et al. | |
| 2008/0238610 A1 | 10/2008 | Rosenberg | |
| 2008/0297306 A1 | 12/2008 | Huajun et al. | |
| 2008/0315989 A1 | 12/2008 | Mirkazemi-Moud et al. | |
| 2009/0018964 A1 | 1/2009 | Liu et al. | |
| 2009/0046858 A1 | 2/2009 | Iyer et al. | |
| 2009/0050689 A1 | 2/2009 | Sako et al. | |
| 2009/0078761 A1 | 3/2009 | Sines | |
| 2009/0097531 A1 | 4/2009 | Franceschini et al. | |
| 2009/0112765 A1* | 4/2009 | Skowronek | 705/44 |
| 2009/0253409 A1 | 10/2009 | Slavov et al. | |
| 2009/0270174 A1 | 10/2009 | Kelly et al. | |
| 2009/0313689 A1* | 12/2009 | Nystrom et al. | 726/9 |
| 2010/0030651 A1 | 2/2010 | Matotek et al. | |
| 2010/0094752 A1 | 4/2010 | Heath | |
| 2010/0133337 A1 | 6/2010 | Van Rensburg | |
| 2011/0006112 A1 | 1/2011 | Mueller | |
| 2011/0053560 A1 | 3/2011 | Jain et al. | |

OTHER PUBLICATIONS

DiMartino, Allison, "Method and System for Blocking Confidential Information at a Point-of-Sale Reader from Eavesdropping," filed Sep. 27, 2007, U.S. Appl. No. 11/863,229.

DiMartino, Allison A., et al., Patent Application entitled, "System and Method for Active Jamming of Confidential Information Transmitted at a Point-of-Sale Reader," filed Jan. 30, 2008, U.S. Appl. No. 12/022,903.

Zhu, Kevin, Patent Application entitled, "Mobil Device Password System," filed Jan. 5, 2009, U.S. Appl. No. 12/348,377.

Zhu, Kevin, Patent Application entitled, "Partially Delegated Over-the-Air Provisioning of a Secure Element," filed Jan. 5, 2009, U.S. Appl. No. 12/348,371.

Persson, Sarah A.V., et al., Patent Application entitled, "Electronic Wallet Removal from Mobile Electronic Devices," filed Feb. 16, 2009, U.S. Appl. No. 12/371,901.

BlackBerry Enterprise Server for Microsoft Exchange, Version 4.0—Handheld Management Guide, Last Modified Aug. 18, 2006, Research in Motion Limited, Canada.

BlackBerry Enterprise Server for Microsoft Exchange, Version 4.0—Administration Guide, Last Modified Nov. 10, 2006, Research in Motion Limited, Canada.

Derfler, Frank J., et al., "How Networks Work," Sep. 2000, Que Corporation, A Division of MacMillan Computer Publishing, USA.

Office Action dated Jun. 17, 2009, U.S. Appl. No. 11/949,759, filed Dec. 3, 2007.

Office Action dated Nov. 13, 2009, U.S. Appl. No. 11/949,759, filed Dec. 3, 2007.

Office Action dated May 25, 2010, U.S. Appl. No. 11/949,759, filed Dec. 3, 2007.

Final Office Action dated Sep. 10, 2010, U.S. Appl. No. 11/949,759, filed Dec. 3, 2007.

Office Action dated Feb. 15, 2011, U.S. Appl. No. 11/949,759, filed Dec. 3, 2007.

Office Action dated Feb. 17, 2009, U.S. Appl. No. 11/863,229, filed Sep. 27, 2007.

Office Action dated Sep. 14, 2009, U.S. Appl. No. 11/863,229, filed Sep. 27, 2007.

Office Action dated Dec. 24, 2009, U.S. Appl. No. 11/863,229, filed Sep. 27, 2007.

Final Office Action dated Jun. 22, 2010, U.S. Appl. No. 11/863,229, filed Sep. 27, 2007.

Office Action dated Mar. 16, 2011, U.S. Appl. No. 11/863,229, filed Sep. 27, 2007.

Office Action dated Mar. 6, 2009, U.S. Appl. No. 11/863,632, filed Sep. 28, 2007.

Office Action dated May 6, 2009, U.S. Appl. No. 11/863,632.

Notice of Allowance dated Dec. 1, 2009, U.S. Appl. No. 11/863,632.

Office Action dated Mar. 11, 2011, U.S. Appl. No. 12/022,903.

Office Action dated Jan. 13, 2011, U.S. Appl. No. 12/348,377.

Office Action—Restriction dated Mar. 16, 2011, U.S. Appl. No. 12/348,371.

Office Action—Restriction dated Mar. 14, 2011, U.S. Appl. No. 12/371,901.

Office Action dated Apr. 14, 2011, U.S. Appl. No. 12/371,901.

Office Action dated May 24, 2011, U.S. Appl. No. 12/348,371.

Final Office Action dated Aug. 22, 2011, U.S. Appl. No. 11/863,229, filed Sep. 27, 2007.

Supplemental Notice of Allowance dated Sep. 13, 2011, U.S. Appl. No. 12/022,903.

Advisory Action dated Aug. 30, 2011, U.S. Appl. No. 12/348,377.

Notice of Allowance dated Sep. 9, 2011, U.S. Appl. No. 12/348,371.

Anonymous, "Sourcebook '96," Progressive Grocer Sourcebook '96 Supplement, Dec. 1995, pp. Cover-48, Maclean-Hunter Media Inc.

DiMartino, Allison A., et al., Patent Application entitled, "System and Method for Active Jamming of Confidential Informaton Transmitted at a Point-of-Sale Reader," filed Aug. 11, 2011, U.S. Appl. No. 13/207,645.

(56) References Cited

OTHER PUBLICATIONS

Final Office Action dated Aug. 5, 2011, U.S. Appl. No. 11/949,759, filed Dec. 3, 2007.
Notice of Allowance dated Jun. 21, 2011, U.S. Appl. No. 12/022,903.
Final Office Action dated Jun. 20, 2011, U.S. Appl. No. 12/348,377.
DiMartino, Allison, Patent Application "Method and System for Setting Levels of Electronic Wallet Security," filed Feb. 8, 2010, U.S. Appl. No. 12/702,270.
Zhu, Kevin, Patent Application entitled, "Partially Delegated Over-the-Air Provisioning of a Secure Element," filed Oct. 10, 2011, U.S. Appl. No. 13/270,205.
Notice of Allowance dated Oct. 17, 2011, U.S. Appl. No. 11/949,759, filed Dec. 3, 2007.
Pre-Interview Communication dated Nov. 15, 2011, U.S. Appl. No. 13/207,645, filed Aug. 11, 2011.
Advisory Action dated Oct. 21, 2011, U.S. Appl. No. 11/863,229, filed Sep. 27, 2007.
Pre-Interview Communication dated Nov. 9, 2011, U.S. Appl. No. 12/702,270, filed Feb. 8, 2010.
Supplemental Notice of Allowance dated Sep. 28, 2011, U.S. Appl. No. 12/022,903.
Supplemental Notice of Allowance dated Oct. 6, 2011, U.S. Appl. No. 12/348,371.
Final Office Action dated Oct. 14, 2011, U.S. Appl. No. 12/371,901.
Notice of Allowance dated Apr. 9, 2012, U.S. Appl. No. 11/863,229, filed Sep. 27, 2007.
Notice of Allowance dated Apr. 2, 2012, U.S. Appl. No. 13/207,645, filed Aug. 11, 2011.
Notice of Allowance dated Apr. 9, 2012, U.S. Appl. No. 13/270,205.
Baker, D., "Real-Time Provisioning of SIM cards: A Boon to GSM Operators", Apr. 13, 2011. http://www.billingworld.com/blogs/baker/2011/04/real-time-provisioning-of-sim-cards-a-boon-to-gsm.aspx.
DiMartino, Allison, "Method for Launching an Electronic Wallet," filed Jan. 4, 2012, U.S. Appl. No. 13/343,708.
Notice of Allowance dated Dec. 14, 2011, U.S. Appl. No. 12/702,270, filed Feb. 8, 2010.
Notice of Allowance dated Jan. 5, 2012, U.S. Appl. No. 12/348,377.
FAIPP Pre-Interview Communication dated Feb. 21, 2012, U.S. Appl. No. 13/270,205.
Advisory Action dated Feb. 9, 2012, U.S. Appl. No. 12/371,901.
Restriction Requirement dated Aug. 6, 2012, U.S. Appl. No. 13/343,708, filed Jan. 4, 2012.
FAIPP Pre-Interview Communication dated Sep. 12, 2012, U.S. Appl. No. 13/343,708, filed Jan. 4, 2012.
FAIPP Office Action dated Nov. 15, 2012, U.S. Appl. No. 13/343,708, filed Jan. 4, 2012.
Notice of Allowance dated Feb. 11, 2013, U.S. Appl. No. 13/343,708, filed Jan. 4, 2012.
Office Action dated Feb. 11, 2013, U.S. Appl. No. 13/535,337, filed Jun. 27, 2012.
Final Office Action dated Jun. 3, 2013, U.S. Appl. No. 13/535,337, filed Jun. 27, 2012.
Advisory Action dated Jul. 30, 2013, U.S. Appl. No. 13/535,337, filed Jun. 27, 2012.

\* cited by examiner

CONTROL OF SECURE ELEMENTS THROUGH POINT-OF-SALE DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile terminals, for example mobile phones, personal digital assistants, and others, have become very widely distributed throughout our society. Increasingly mobile terminals are provisioned with financial and/or payment capabilities such as electronic wallets, credit cards, debit cards, and/or transit cards. These portable mobile terminals may also store vehicle electronic access codes, hotel door electronic access codes, and/or employee badge electronic identification codes. This financial and access information may be referred to collectively as confidential information. Some of the confidential information may be stored in a secure element (SE) portion of the memory of the mobile terminal. Typically, secure elements are communicated with according to known protocols directed to promote security of information stored in the secure element, for example personal financial information. Over time, new cards and/or new electronic access codes may be provisioned in the secure element of the mobile terminal or in other portions of the memory of the mobile terminal. Provisioning of new cards and/or new electronic access codes may be performed over-the-air (OTA), for example by an over-the-air server sending provisioning messages to an over-the-air client on the mobile terminal. Payment transactions may be completed by a point-of-sale device exchanging handshaking information with the mobile terminal and the mobile terminal providing the confidential information needed to complete the payment transaction. Access may be completed by an exchange of information between an electronic reader and the mobile terminal wherein the mobile terminal provides the confidential information needed to authorize access.

SUMMARY

A method of preventing identity theft is disclosed. The method comprises reading confidential information from a mobile terminal that is not in communication with the public wireless communication network and determining if the mobile terminal has been reported lost. When the mobile terminal is determined to have been reported lost, the release of the confidential information by the mobile terminal is disabled.

A system for securing confidential information stored in a mobile terminal is disclosed. The system comprises a secure element management computer, a secure element management application executing on the secure element management computer, and a point-of-sale device. The secure element management application receives a request to determine if the mobile terminal is reported lost and provides at least one instruction for disabling release of the confidential information by the mobile terminal when the mobile terminal is determined to be reported lost. The point-of-sale device is in communication with the secure element management computer and sends the request to determine if the mobile terminal is reported lost to the secure element management computer in response to reading at least some of the confidential information stored in the mobile terminal to complete a payment transaction. The point-of-sale device also receives the at least one instruction for disabling release of the confidential information by the mobile terminal and transmits these instructions to the mobile terminal. This action disables the further release of confidential information from the mobile terminal that has been reported lost.

A method of controlling secure elements is disclosed. The method comprises receiving a report that a mobile terminal containing a secure element is lost and, while the mobile terminal is inaccessible to the wireless radio access network, receiving a release of confidential information stored in the secure element of the mobile terminal. The method also comprises receiving a message containing instructions that are directed to disable the further release of confidential information stored in the secure element of the mobile terminal and transmitting these instructions to the mobile terminal.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The use of mobile terminals to complete payment transactions and access transactions by disclosing confidential information stored on the mobile terminals exposes a vulnerability to identify theft if the mobile terminal is lost. As used herein, the term lost is used to indicate that the mobile terminal is out of assured direct or indirect control of the authorized user, for example stolen, misplaced, and/or borrowed without the knowledge of the authorized user. An identity thief who has stolen or otherwise appropriated the mobile terminal may disable the connectivity of the mobile terminal to the wireless radio access network, for example by selecting an airplane mode of operation of the mobile terminal, while retaining the functionality of the mobile terminal to complete payment transactions and access transactions. Some mobile terminal embodiments may promote turning off a radio transceiver for accessing the wireless radio access network while leaving another transceiver, for example a near field communications transceiver, in service that may be used by the mobile terminal to complete payment transactions and access transactions. An identity thief may disable the connectivity of the mobile terminal to the wireless radio access network of such a mobile terminal by powering off the radio transceiver for accessing the wireless radio access network while retaining the functionality of the mobile terminal to complete payments and access transactions by leaving the other transceiver, for example a near field communications transceiver, in service. An identify thief may also disable the connectivity of the mobile terminal to the wireless radio access network by powering off the mobile terminal and powering on the mobile terminal immediately before attempting to complete payment transactions and/or access transactions. The mobile terminal may communicate with point-of-sale devices and electronic readers using near field communication technology unrelated to the wireless radio access network.

A system and method for disabling the release of confidential information by the mobile terminal when it is reported to be lost is described below. When an attempt to release confidential information is made, for example at a point-of-sale terminal when credit card information is provided by the mobile terminal to complete a payment transaction, the system determines whether the mobile terminal has been reported as lost. If the mobile terminal has been reported as lost, instructions directed to disabling further release of confidential information by the mobile terminal, for example payment for goods and services using credit card information stored in a secure element (SE) of the mobile terminal, is sent to the mobile terminal. The mobile terminal executes the disabling instructions, for example erasing the secure element or portions of the secure element and/or performing other disabling operations, and thereafter the mobile terminal will not release confidential information until the mobile terminal is reported as recovered and appropriate instructions for again enabling release of confidential information are provided to the mobile terminal and are executed by the mobile terminal. In some embodiments, the loss of the mobile terminal is reported to one or more authorization entities, for example credit card companies and/or corporate physical security departments, and the authorization entities send the disabling instructions to the point-of-sale terminal or the electronic reader. A secure element management platform may provide the disabling instructions to the authorization entities. In another embodiment, the loss of the mobile terminal is reported to the secure element management platform, and the point-of-sale device and/or the electronic reader sends a message to the secure element management platform to determine if the mobile terminal has been reported as lost. If the mobile terminal has been reported as lost, the secure element management platform sends the disabling instructions to the point-of-sale device and/or the electronic reader, and the point-of-sale device and/or the electronic reader transmits the disabling instructions to the mobile terminal. The mobile terminal executes the disabling instructions and is thereafter disabled from releasing the confidential information. In an embodiment, the point-of-sale terminal and/or electronic reader may request to rescan or re-sweep the mobile terminal, purportedly because the first reading of confidential information failed but in fact to complete the transmission of disabling instructions.

Figure 1:
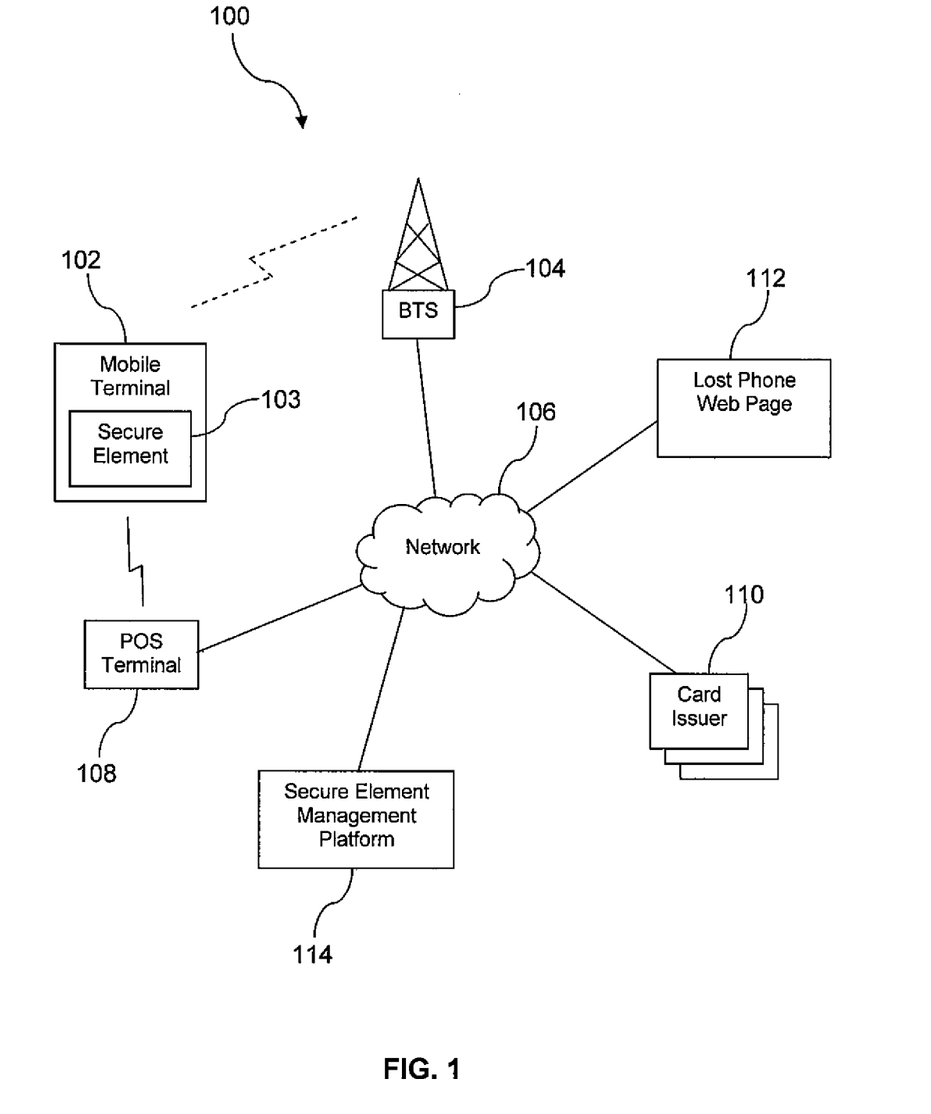
FIG. 1 illustrates a communication system according to an embodiment of the disclosure.

Turning now to FIG. 1, a communication system 100 according to an embodiment of the disclosure is described. The system 100 comprises a mobile terminal 102, a base transceiver station (BTS) 104, a network 106, a point-of-sale (POS) terminal 108, one or more payment card issuers 110, a lost phone web page 112, and a secure element (SE) management platform 114. Some portions of the system 100 may be implemented on general purpose computer systems, for example the point-of-sale terminal 108, the secure element management platform 114, the lost phone web page 112, and the payment card issuers 110. General purpose computer systems are described further hereinafter.

In some contexts the secure element management platform 114 may be referred to as a secure element management application. The mobile terminal 102 may be used to communicate wirelessly with the base transceiver station 104 and therethrough to the network 106. For example, the mobile terminal 102 may complete voice calls to another telephone (not shown) through the network 106 via the base transceiver station 104. Additionally, the mobile terminal 102 may complete data calls, for example accessing web page content and/or multi-media content, through the network 106 via the base transceiver station 104. The mobile terminal 102 may be a mobile phone, a personal digital assistant, a pager, a tablet computer, a laptop computer, or other portable wireless device. An embodiment of the mobile terminal 102 as a handset is described hereinafter.

The point-of-sale terminal 108, the secure element management platform 114, the payment card issuer 110, and the lost phone web page 112 are in communication with each other, as needed, through the network 106. The network 106 may comprise the public switched telephone network, the public data network (e.g., the Internet), the public radio access network, or portions thereof.

The mobile terminal 102 may contain a secure element 103 that contains confidential information that may be used to complete payment transactions. In another embodiment, however, the confidential information may be stored in another area of the mobile terminal 102 not associated with the secure element 103. The confidential information may include credit card account numbers, validation numbers, and other information needed to complete a credit card payment. The confidential information may include debit card information, transit card information, hotel room electronic access codes, vehicle electronic access codes, and other confidential information. The mobile terminal 102 may communicate with the point-of-sale terminal 108, or other reader (not shown), to complete transactions based on releasing confidential information stored in the mobile terminal 102, for example stored in the secure element 103. In an embodiment, the mobile terminal 102 may communicate with the point-of-sale terminal 108 using near field communications (NFC) technology. In other embodiments, however, other communications mechanisms may be employed. For example, the mobile terminal 102 may communicate with the point-of-sale terminal 108 using infrared signals, using Bluetooth wireless signals, using WiFi wireless signals, using industrial-scientific-medical (ISM) band wireless signals, or other communication signals.

If the mobile terminal 102 is lost by a user and found by an identity thief, the mobile terminal 102 may be used to make unapproved purchases by the identity thief or to access a hotel room, a home, an office building, or vehicle without the consent of the owner of the mobile terminal 102. Loss of the mobile terminal 102 may be reported using the lost phone web page 112, for example by the owner of the mobile terminal 102 logging into the lost phone web page 112 by entering a private access code or identification number and reporting the loss of the mobile terminal 102. A computer application, not shown, may inform either the secure element management platform 114 and/or the payment card issuer 110 of the loss of the mobile terminal 102. In embodiment, the secure element management platform 114 may attempt to send the mobile terminal 102 executable instructions or codes that disable the release of confidential information from the secure element 103 of the mobile terminal 102 that is lost. The secure element management platform 114 may attempt to send the disabling codes via the base transceiver station 104 to the mobile terminal 102. The identity thief, however, may disable the mobile terminal 102 for access to the base transceiver station 104, for example by placing the mobile terminal 102 in an airplane mode and/or by turning off the radio transmitter used by the mobile terminal 102 for communication with the base transceiver station 104. The identity thief may power off the mobile terminal 102 with the intention of powering on the mobile terminal 102 immediately before completing a payment transaction or access transaction, hoping that the transaction may be completed before the disabling codes can be transmitted via the base transceiver station 104 to the mobile terminal 102.

In an embodiment, when the mobile terminal 102 transmits confidential information, for example to the point-of-sale terminal 108, a check is made to determine if the mobile terminal 102 has been reported as lost. For example, the point-of-sale terminal 108 may send a query message for a lost phone check to the secure element management platform 114 via the network 106. If the secure element management platform 114 determines that the mobile terminal 102 has been reported as lost, the secure element management platform 114 sends appropriate instructions or codes for disabling the secure element 103 in the mobile terminal 102 to the point-of-sale terminal 108. The point-of-sale terminal 108 then sends the disabling codes to the mobile terminal 102, and the mobile terminal 102 executes the codes, disabling the release of further confidential information from the secure element 103. The codes, when executed, may erase all or portions of the secure element 103. The codes, when executed, may perform other disabling operations. Alternatively, if the confidential information is not stored in the secure element 103 but is stored in a different area of the mobile terminal 102, the secure element management platform 114 may send codes for disabling the release of the confidential information from the different area of the mobile terminal 102.

In another embodiment, the point-of-sale terminal 108 may send the query message for a lost phone check to the appropriate payment card issuer 110. If the payment card issuer 110 determines that the mobile terminal 102 had been reported as lost, the payment card issuer 110 may request codes for disabling the secure element 103 from the secure element management platform 114. The payment card issuer 110 may then transmit the codes for disabling the secure element 103 to the point-of-sale terminal 108. The point-of-sale terminal 108 may then transmit the codes for disabling the secure element 103 to the mobile terminal 102 as described above.

In an embodiment, if the mobile terminal 102 is recovered, for example the phone is found at a sporting event where it was misplaced and returned to the owner several days later or the phone is found under furniture in the home, the secure element 103 may be re-enabled by sending appropriate codes to the mobile terminal 102. In an embodiment, the codes for re-enabling the release of confidential information may be sent to the mobile terminal 102 by the base transceiver station 104. The mobile terminal 102 may execute the codes for re-enabling the release of confidential information and restore the capability of electronic payment and access.

In an embodiment, the disabling codes sent from the secure element management platform 114 to the point-of-sale terminal 108 and from the point-of-sale terminal 108 to the mobile terminal 102, for example when the point-of-sale terminal 108 determines that the mobile terminal 102 has been reported as lost, cause the mobile terminal 102 to be locked when the disabling codes are executed by the mobile terminal 102. In the locked mode, the mobile terminal 102 cannot make phone calls, cannot access the Internet, and cannot execute applications such as open and navigate through a contact or address book. If the mobile terminal 102 is later found by the authorized user, the mobile terminal 102 may be restored to normal service by taking the mobile terminal 102 to a service outlet of the service provider or by another procedure.

Figure 2:
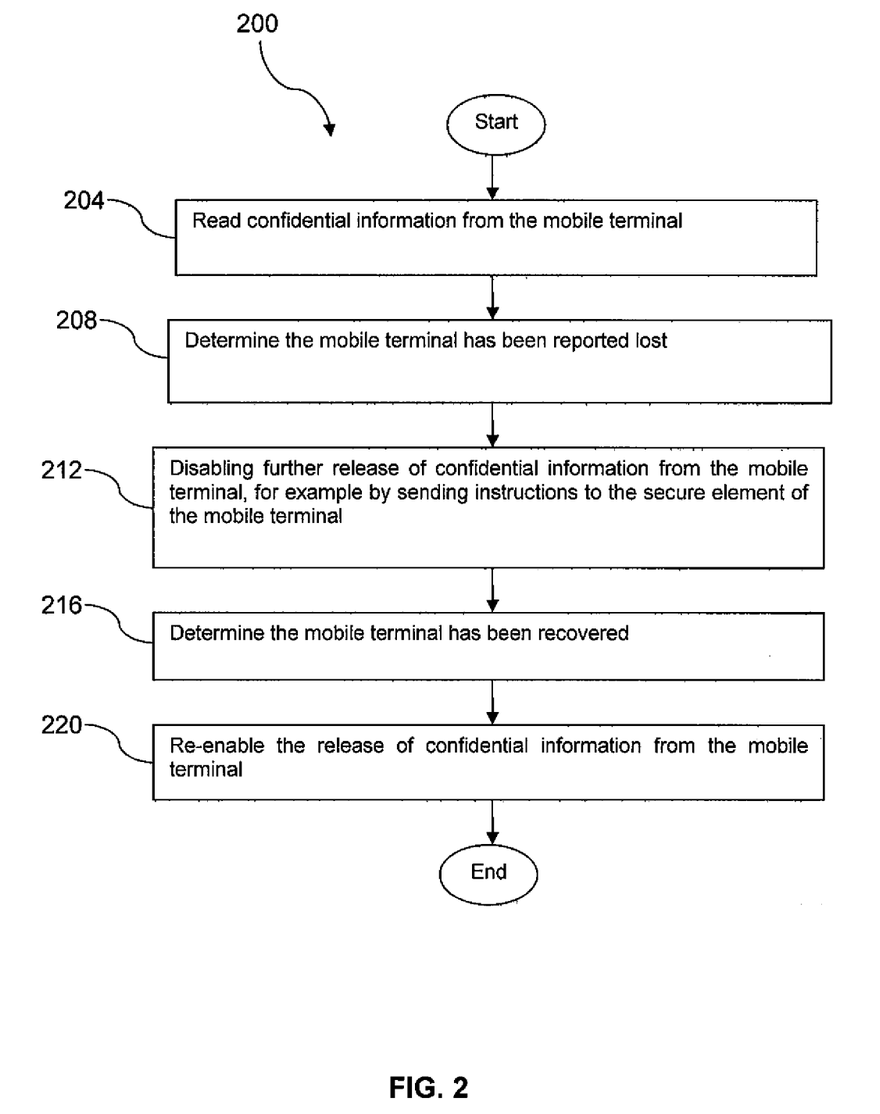
FIG. 2 illustrates a method of controlling secure elements according to an embodiment of the disclosure.

Turning now to FIG. 2, a method 200 is described. At block 204, confidential information is read from the mobile terminal 102, for example at the point-of-sale terminal 108. In another example, however, the confidential information may be read by a hotel access reader, an office building access reader, a vehicle access reader, or other electronic reader.

At block 208, a check is made to determine if the mobile terminal 102 had been reported to be lost. For example, the point-of-sale terminal 108 or an access reader sends a query message to the secure element management platform 114. If the mobile terminal 102 has been reported to be lost, codes for disabling the secure element 103 of the mobile terminal 102 may be transmitted to the point-of-sale terminal 108 or access reader. In an alternative embodiment, however, the point-of-sale terminal 108 and/or the access reader may be pre-provisioned with the codes for disabling the secure element 103 of the mobile terminal 102.

At block 212, further release of confidential information from the secure element 103 of the mobile terminal 102 is disabled. For example, the point-of-sale terminal 108 or the access reader may transmit the codes for disabling the secure element 103 to the mobile terminal 102. In an embodiment, the mobile terminal 102 is configured or otherwise programmed to respond to receiving the disabling codes by executing the codes, thereby disabling the secure element 103 or disabling the capability of another area of the mobile terminal 102 used to release the confidential information. In an embodiment, when the point-of-sale terminal 108 determines that the mobile terminal 102 has been reported lost, a display of the point-of-sale terminal 108 may prompt an operator of the point-of-sale terminal 108 or the person wielding the mobile terminal 102 to rescan or re-present the mobile terminal 102. It may be during this rescanning or re-presentation of the mobile terminal 102 that the disabling codes are transmitted to the mobile terminal 102 and executed by the mobile terminal 102.

At block 216, it is determined that the mobile terminal 102 has been recovered. At block 220, the release of confidential information from the mobile terminal 102 is re-enabled, for example by transmitting codes for re-enabling the secure element 103 to the mobile terminal 102 from the base transceiver station 104.

Figure 3:
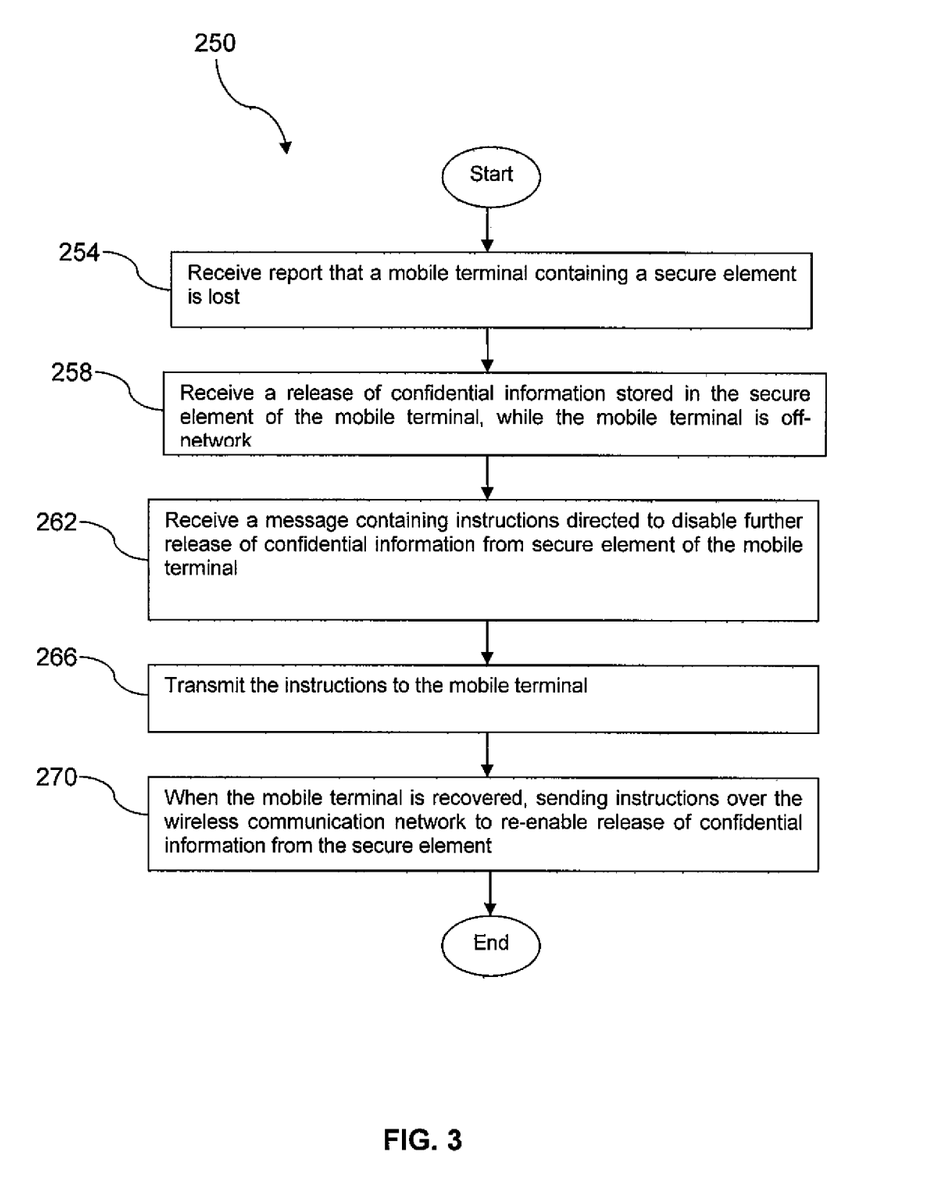
FIG. 3 illustrates another method of controlling secure elements according to an embodiment of the disclosure.

Turning now to FIG. 3, a method 250 is described. At block 254, a report that the mobile terminal 102 containing the secure element 103 is received, for example by the lost phone web page 112. At block 258, a release of confidential information from the secure element 103 is received while the mobile terminal 102 is off-network, for example when the mobile terminal 102 cannot be reached through the base transceiver station 104. The mobile terminal 102 may be off-network because the battery is discharged, because the mobile terminal 102 is turned off, because the mobile terminal 102 is in an airplane operation mode, or because the mobile terminal 102 is outside a coverage area of the wireless network.

In block 262, a message containing instructions operable to disable the secure element 103 of the mobile terminal 102 is received, for example by the point-of-sale terminal 108 or other device. In block 266, the instructions operable to disable the secure element 103 are transmitted to the mobile terminal 102, for example using near field communications or other communications means. The instructions operable to disable the secure element 103 may be transmitted during the course of an exchange with the point-of-sale terminal 108 that purports to be just a rescan of the mobile terminal 102, as if the first attempt experienced a trivial problem and needs to be repeated. In block 270, when the mobile terminal 102 is recovered, instructions to re-enable the release of confidential information from the secure element 103 are transmitted over the wireless communication network to the mobile terminal 102.

Figure 4:
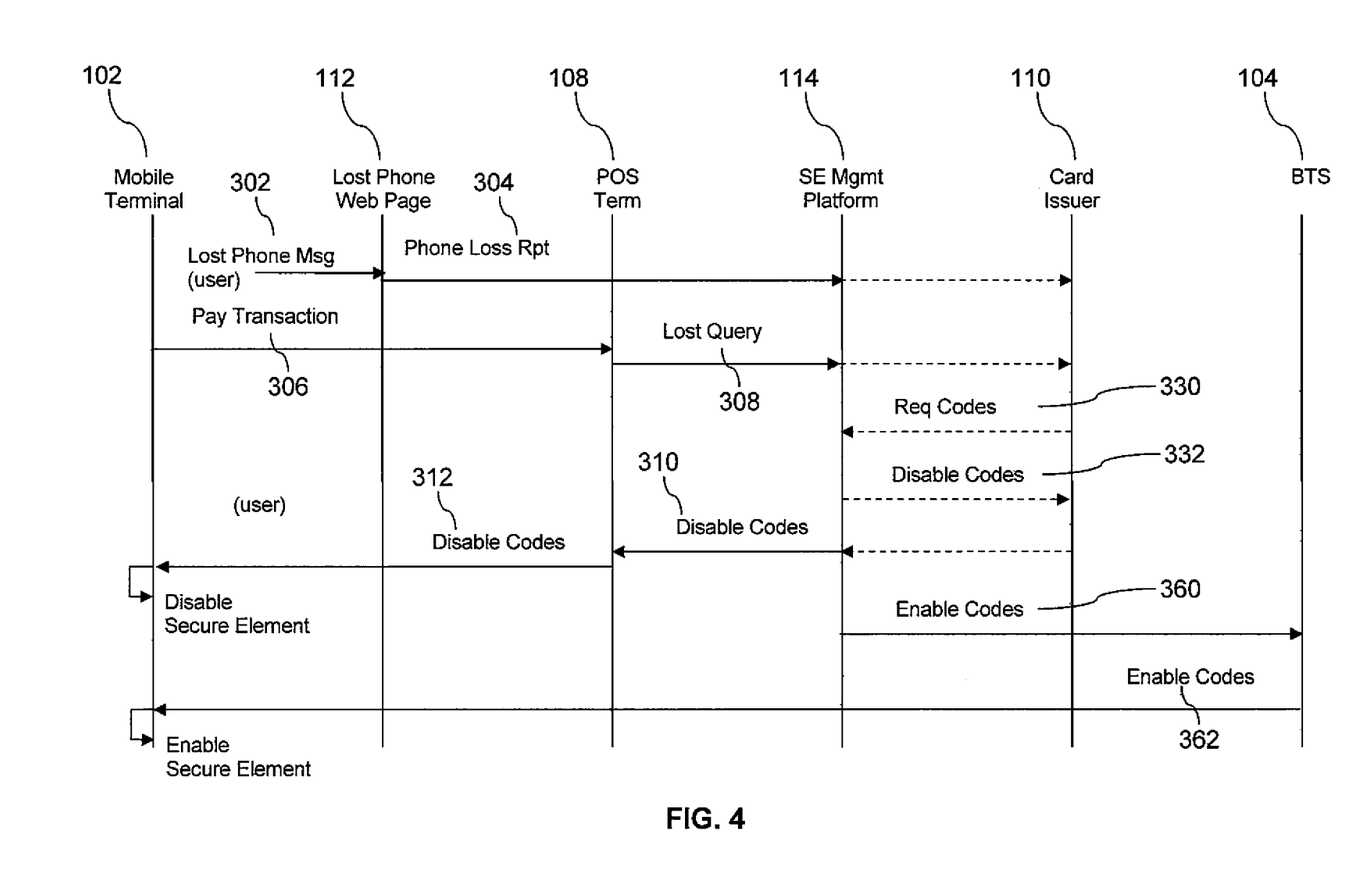
FIG. 4 illustrates a message sequence according to an embodiment of the disclosure.

Turning now to FIG. 4, a message sequence diagram is discussed. A user of the mobile terminal 102 sends a lost phone message 302 to the lost phone web page 112. For example, the user may log into the lost phone web page 112 and report the mobile terminal 102 missing. The lost phone web page 112 may respond to the lost phone message by sending a phone loss report 304 to the secure element management platform 114 and/or the appropriate payment card issuer 110.

Later, the mobile terminal 102 is presented at the point-of-sale terminal 108 and initiates a payment transaction 306. The point-of-sale terminal 108 sends a lost phone query 308 to the secure element management platform 114 or to the appropriate payment card issuer 110. If the payment card issuer 110 determines that the mobile terminal 102 has been reported as lost, the payment card issuer 110 sends a request codes message 330 to the secure element management platform 114 to obtain the codes for disabling the release of confidential information from the secure element 103. The secure element management platform 114 returns a disable codes message 332 to the payment card issuer 110.

The secure element management platform 114 or the payment card issuer 110 sends a disable codes message 310 to the point-of-sale terminal 108. The point-of-sale terminal 108 sends a disable codes message 312 to the mobile terminal 102. The mobile terminal 102 executes the disable codes, thereby disabling the further release of confidential information from the secure element 103.

Later the mobile terminal 102 is recovered by the owner who requests that the secure element 103 be enabled to release the confidential information again. At this point the mobile terminal 102 is accessible to the network from the base transceiver station 104. The secure element management platform 114 sends an enable codes message 360 to the base transceiver station 104, and the base transceiver station 104 sends an enable codes message 362 to the mobile terminal 102. The mobile terminal 102 executes the enable codes, thereby re-enabling the secure element 103 to release confidential information and complete electronic transactions with the point-of-sale terminal 108 and/or access code readers.

Figure 5:
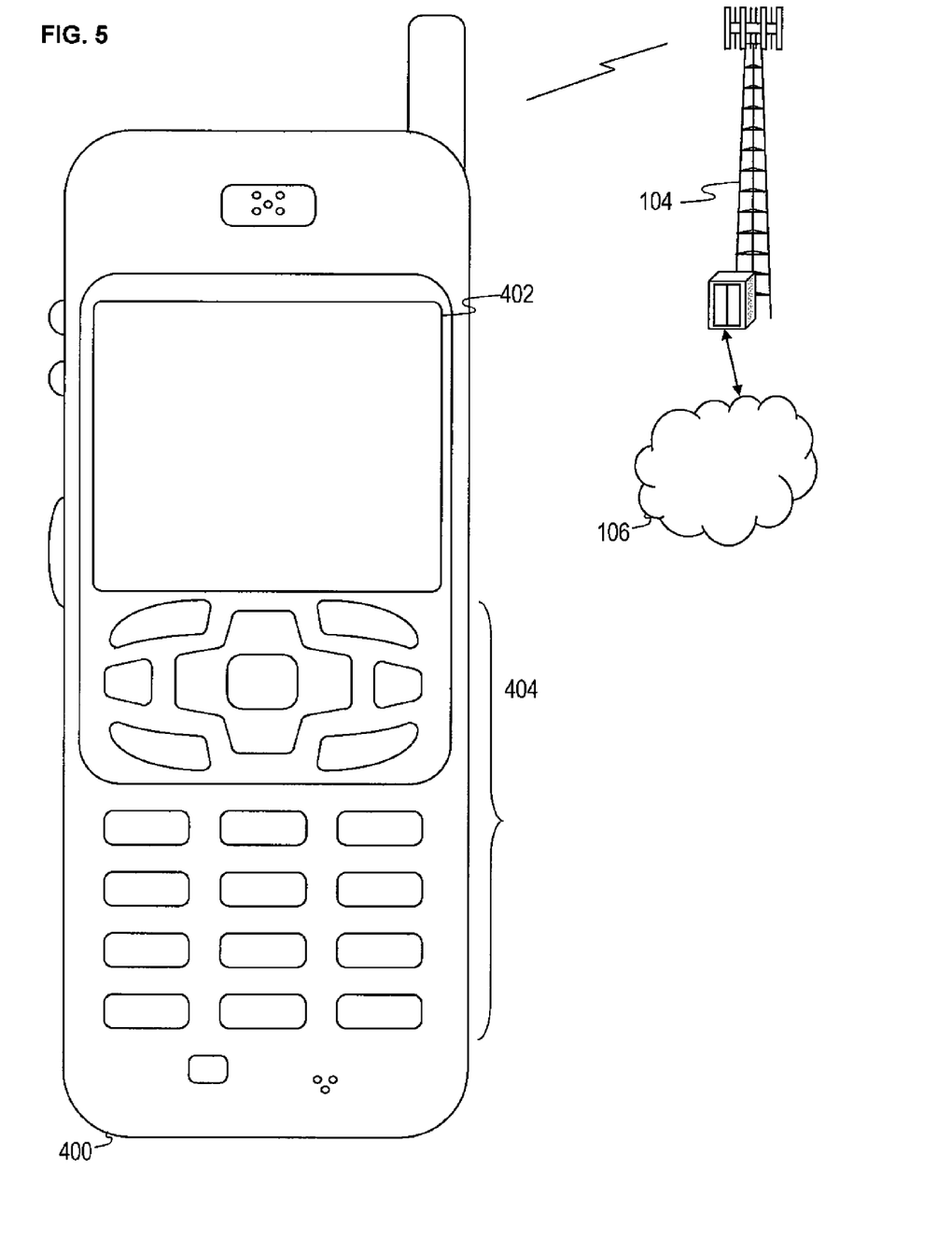
FIG. 5 illustrates a handset according to an embodiment of the disclosure.

FIG. 5 illustrates a handset 400 which is operable for implementing aspects of the present disclosure, but the present disclosure should not be limited to these implementations. In some embodiments, the mobile terminal 102 may be implemented in a form substantially similar to the handset 400. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized activities such as gaming, inventory control, job control, and/or task management functions, and so on.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from the base transceiver station 104.

Figure 6:
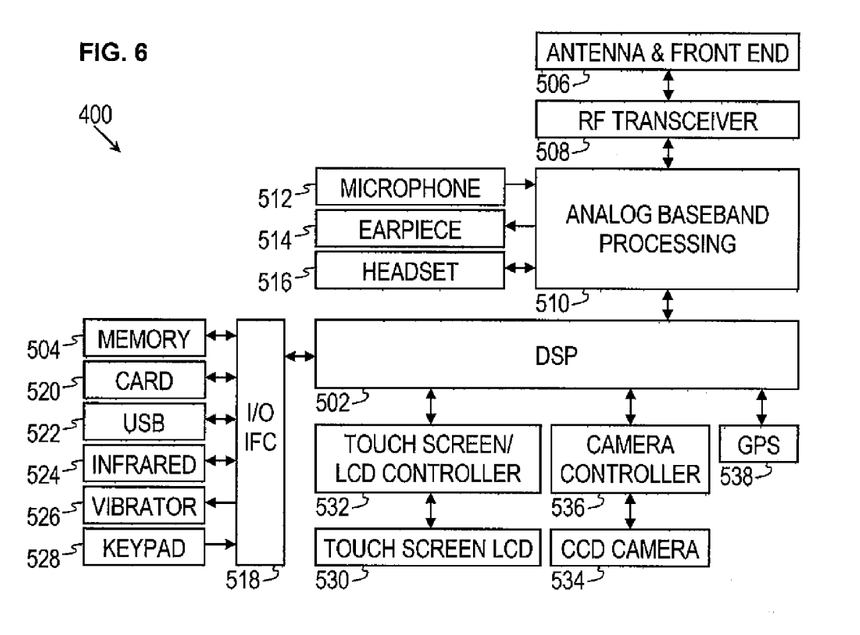
FIG. 6 is a block diagram of a handset according to an embodiment of the disclosure.

FIG. 6 shows a block diagram of the handset 400. While a variety of known components of handsets 400 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network or from a peer handset 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology other than charge coupled device cameras may be employed. Various other peripherals may also be included to provide additional functions, e.g., radio and television reception.

Figure 7:
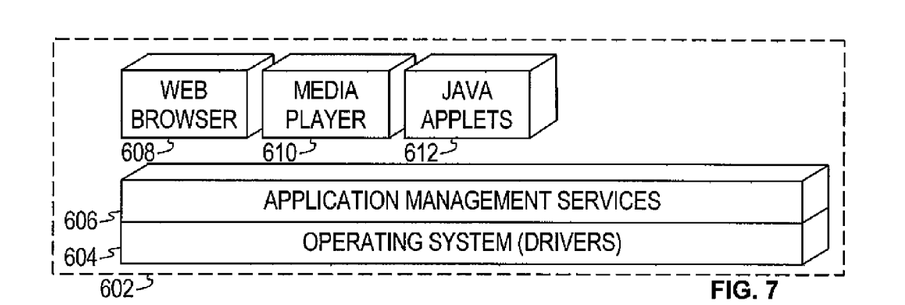
FIG. 7 is a block diagram of a software architecture of a handset according to an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 7 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality.

Figure 8:
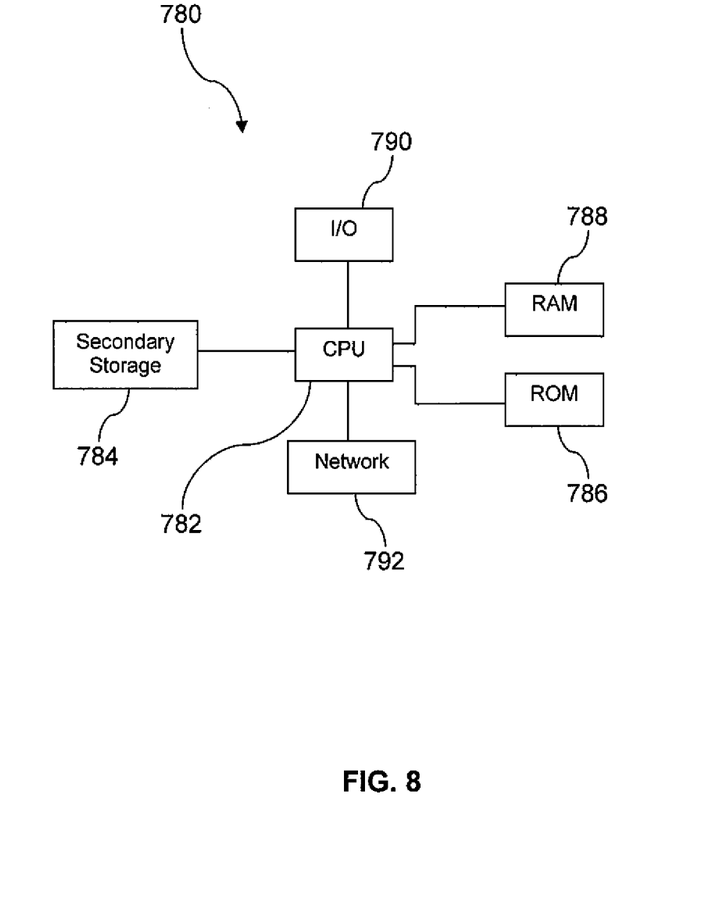
FIG. 8 illustrates an exemplary general purpose computer system suitable for implementing one or more aspects of an embodiment of the disclosure.

Portions of the communication system 100 described above may be implemented on any general-purpose computer with sufficient processing power, memory resources, and network throughput capability to handle the necessary workload placed upon it. For example, in an embodiment, the point-of-sale terminal 108, the secure element management platform 114, and the payment card issuer 110 may be implemented as a general purpose computer system. The lost phone web page 112 may be posted by a server program that executes on a general purpose computer system. FIG. 8 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of preventing identity theft, comprising:
reading confidential information from a mobile terminal that is not in communication with the public wireless communication network;
determining if the mobile terminal that is not in communication with the public wireless communication network has been reported lost; and
disabling the release of the confidential information by the mobile terminal that is not in communication with the public wireless communication network when the mobile terminal is determined to have been reported lost by sending instructions to the mobile terminal without using the public wireless communication network, wherein the instructions are transmitted to the mobile terminal using near field communications technology, and wherein the mobile terminal executes the instructions to disable the release of the confidential information.

2. The method of claim 1, wherein the confidential information is payment information associated with at least one of a credit card, a gas card, a debit card, and a transit card.

3. The method of claim 1, wherein the confidential information is personal identification information associated with at least one of an employee badge and a hotel key.

4. The method of claim 1, further comprising enabling the release of confidential information by the mobile terminal when the mobile terminal is reported as recovered.

5. The method of claim 1, wherein the mobile terminal is one of a mobile phone, a personal digital assistant, a laptop computer, and a tablet computer.

6. The method of claim 1, wherein the instructions are sent to a secure element storing the confidential information in the mobile terminal.

7. A system for securing confidential information stored in a mobile terminal, comprising:
   a secure element management computer;
   a secure element management application that, when executed on the secure element management computer, receives a request to determine if the mobile terminal is reported lost and provides at least one instruction for disabling release of the confidential information by the mobile terminal when the mobile terminal is determined to be reported lost; and
   a point-of-sale device, in communication with the secure element management computer, that sends the request to determine if the mobile terminal is reported lost to the secure element management computer in response to reading at least some of the confidential information stored in the mobile terminal to complete a payment transaction, that receives the at least one instruction for disabling release of the confidential information by the mobile terminal, and that transmits to the mobile terminal via near field communications technology the at least one instruction for disabling release of the confidential information by the mobile terminal, wherein the mobile terminal executes the at least one instruction to disable the release of the confidential information, whereby the mobile terminal which has been reported as lost is disabled from releasing confidential information stored in the mobile terminal.

8. The system of claim 7, wherein the secure element management application further receives a plurality of reports of lost mobile terminals, stores the reports, and determines that the mobile terminal is lost by examining the stored reports.

9. The system of claim 7, wherein the secure element management application sends instructions to the mobile terminal to enable the release of the confidential information by the mobile terminal after receiving notification that the mobile terminal has been recovered.

10. The system of claim 7, wherein the confidential information is at least one of credit card information, debit card information, and transit card information.

11. A method of controlling secure elements, comprising:
   receiving a report that a mobile terminal containing a secure element is lost;
   while the mobile terminal is inaccessible to the wireless radio access network, receiving a first release of confidential information stored in the secure element of the mobile terminal;
   receiving, in response to receiving the report, a message containing instructions that are directed to disable a second release of confidential information stored in the secure element of the mobile terminal that is inaccessible to the wireless radio access network; and
   transmitting, in response to receiving the message, to the mobile terminal that is inaccessible to the wireless radio access network the instructions directed to disable the second release of confidential information without using the wireless radio access network, wherein the instructions are transmitted to the mobile terminal using near field communications technology, and wherein the mobile terminal executes the instructions to disable the second release of confidential information.

12. The method of claim 11, further comprising:
   receiving a report that the mobile terminal containing the secure element is recovered; and
   sending a message to the mobile terminal containing instructions that are directed to enable the release of confidential information stored in the secure element of the mobile terminal.

13. The method of claim 11, further comprising sending the report that the mobile terminal containing a secure element is lost to at least one issuer of an electronic payment account, wherein the message containing instructions that are directed to disable the second release of confidential information stored in the secure element of the mobile terminal is sent by the at least one issuer of the electronic payment account associated with the release of confidential information stored in the secure element of the mobile terminal.

14. The method of claim 11, wherein the confidential information comprises at least one of credit card account information, debit card account information, and transit card account information.

15. The method of claim 11, wherein the instructions that are directed to disable the second release of confidential information are instructions to erase at least portions of a secure element memory area of the mobile terminal.

16. The method of claim 11, wherein the instructions that are directed to disable the second release of confidential information further are directed to lock the mobile terminal, wherein the mobile terminal when locked is unable to complete phone calls, to access the Internet, and to execute applications.

17. The method of claim 11, wherein the confidential information is one of a hotel electronic key entry, vehicle electronic key entry, and employee badge electronic identity.

18. The method of claim 11, further comprising, in response to receiving the release of confidential information, determining whether the mobile terminal is reported lost.

* * * * *